United States Patent [19]

Johnson

[11] 4,226,085
[45] Oct. 7, 1980

[54] UNITARY PLUG MIXER AND SUPPORT THEREFOR

[75] Inventor: Leonard A. Johnson, Ellington, Conn.

[73] Assignee: United Technologies Corporation, Hartford, Conn.

[21] Appl. No.: 877,206

[22] Filed: Feb. 13, 1978

[51] Int. Cl.² ............................................. F02K 3/02
[52] U.S. Cl. ...................................... 60/262; 60/264
[58] Field of Search ................. 60/262, 264; 181/220; 239/265.17, 265.19

[56] References Cited

U.S. PATENT DOCUMENTS

| 3,048,376 | 8/1962 | Howald et al. | 60/262 |
| 3,053,340 | 9/1962 | Kutney | 60/264 |
| 3,514,955 | 6/1970 | Paulson et al. | 60/262 |
| 4,117,671 | 10/1978 | Neal et al. | 60/262 |

Primary Examiner—Louis J. Casaregola
Attorney, Agent, or Firm—Norman Friedland

[57] ABSTRACT

A single point attachment for a unitary tail pipe plug and convoluted lobe mixer supports the assembly in the tail pipe of a turbofan engine.

4 Claims, 2 Drawing Figures

UNITARY PLUG MIXER AND SUPPORT THEREFOR

BACKGROUND OF THE INVENTION

This invention relates to gas turbine engines for aircraft and particularly to the support means and the construction of the tail pipe plug and convoluted lobe mixer.

It has been customary to attach the tail pipe plug of the jet engine at its forward end to the turbine exhaust case so that it extended axially toward the rear of the engine. Further, accepted practice was to similarly attach the lobe mixer to the turbine exhaust case by weldment or bolting. Thus each unit would include its own support system and necessitated adding support structure to the turbine exhaust case.

Obviously, for maintenance purposes, having two independent attaching means requires the operator the dual task of removing each unit separately. This is not only cumbersome but requires all the separate hardware required for attachment purposes. Moreover, in existing engine installations where it is desirable to retrofit the engine with the lobe mixer for noise reduction purposes, it becomes a major task to rework the turbine exhaust case to accommodate the mixer.

I have found that I can obviate the problems noted above by combining the mixer and plug as a single unit and attaching these units to the engine case rather than the turbine exhaust case. The unit can then be slip jointed to the exhaust case which has the additional advantage of reducing the stresses occasioned by thermal growth.

A feature of this invention is to combine the tail pipe plug and lobe convoluted mixer of a gas turbine engine into a single integral unit and having a single point attachment to the engine case rather than the turbine exhaust case. Slip joints in proximity to the case allow for easy assembly and disassembly and improvements occasioned by thermal growth.

An advantage of the single unitary assembly permits the retrofitting of existing engines without necessitating the reworking of the turbine exhaust case.

Other features and advantages will be apparent from the specification and claims and from the accompanying drawings which illustrate an embodiment of the invention.

DESCRIPTION OF THE PREFERRED EMBODIMENT

In its preferred embodiment the lobe mixer is utilized on a fan-jet engine where the fan air and the engine core air comingle downstream of the turbine and the lobe mixer serves to mix the two airstreams so as to achieve a noise reduction and an increase in overall engine performance. It is contemplated that certain engine models, as for example the JT-8D manufactured by the Pratt & Whitney Aircraft Division of United Technologies Corporation, assignee of this application, could easily be retrofitted to accommodate this invention without incurring a great deal of engine or aircraft structure rework which would otherwise be the case.

Figure 1:
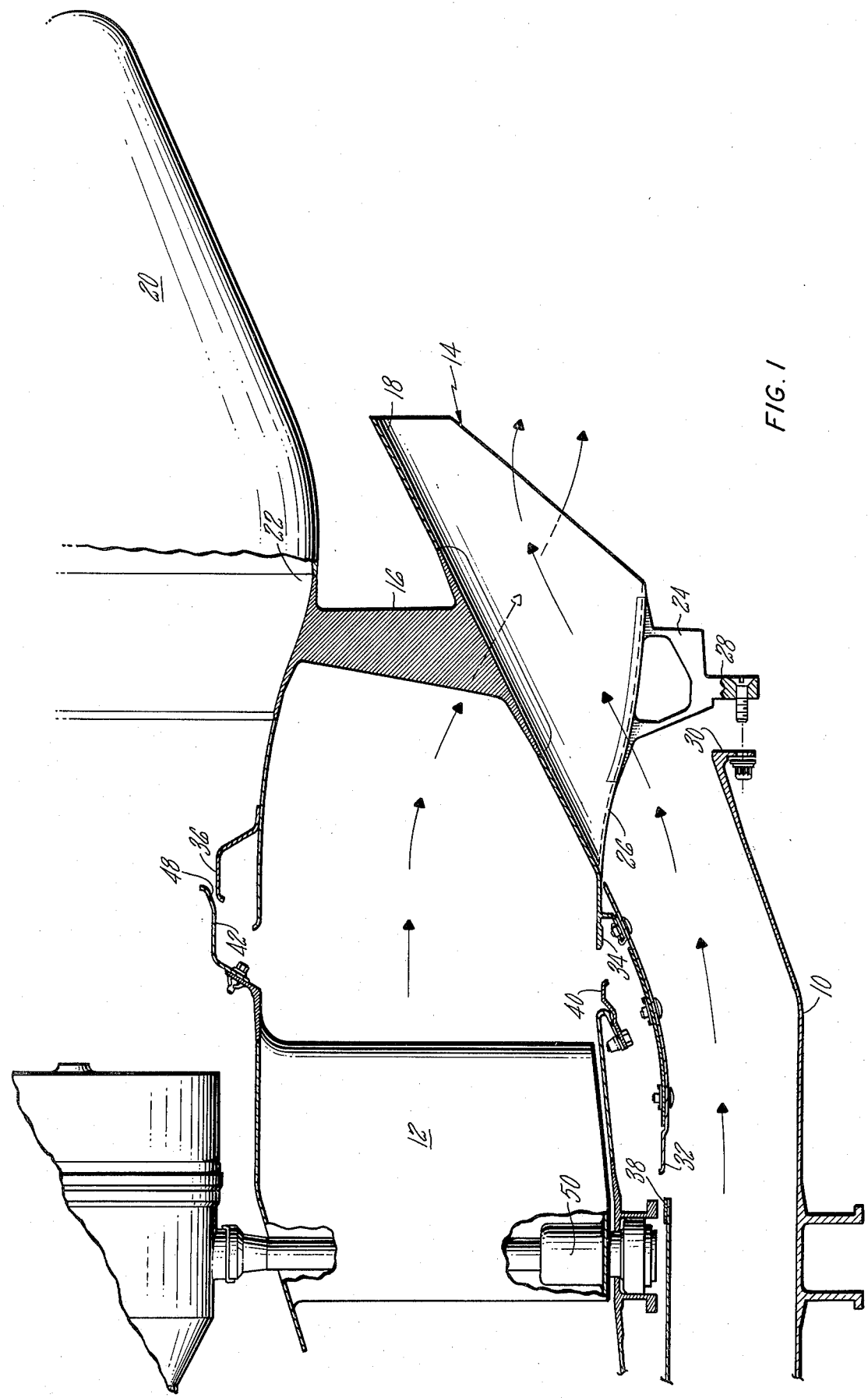
FIG. 1 is a partial side elevation view showing the details of this invention.
Figure 2:
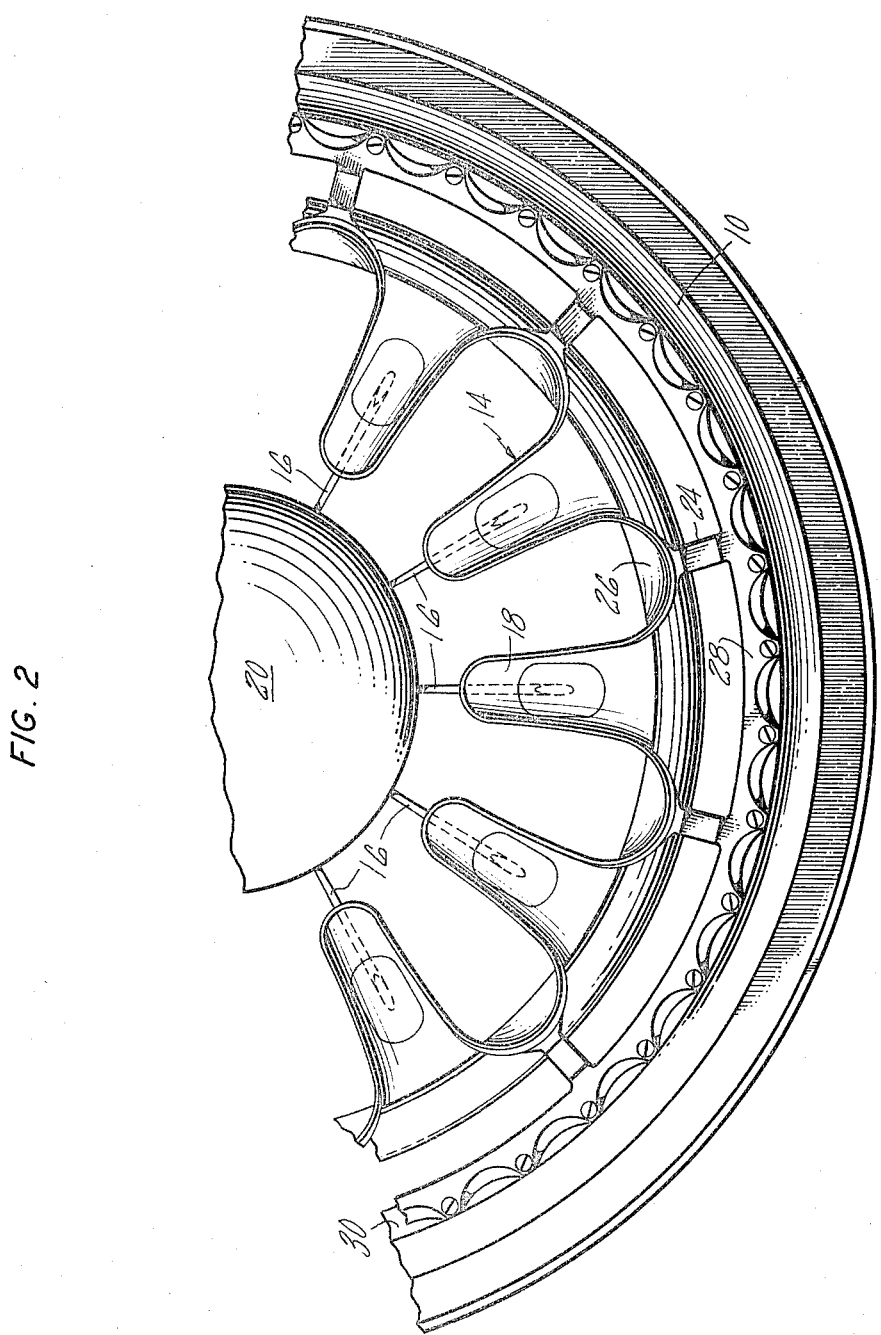
FIG. 2 is a partial end view of the unitary plug and lobe convoluted mixer.

Referring to FIG. 1 and FIG. 2 it can be seen that the rear portion of the jet engine is illustrated as having an outer case or tail pipe 10 surrounding and supporting the turbine exhaust case 12 (shown in full) and for further details of construction of these elements reference should be made to the aforementioned JT-8D engine. It is to be understood that these components are existing production elements and the description relates to retrofitting this engine to accommodate a mixer, where one never existed before.

According to the invention, convoluted, lobe mixer 14 carries a plurality of struts 16 circumferentially mounted on the inner mixer lobe valley 18 and is attached to plug 20 which may incorporate a strengthening ring 22. Similarly, a plurality of circumferentially mounted struts 24 are affixed to the outer mixer lobe crown 26 and is formed integral with the ring 28 which is formed in a depending flange adapted to mate with flange 30 (an existing part). A plurality of bolt assemblies serves to fasten the unitary mixer/plug assembly in place.

As can be seen in FIG. 1, the front end of the mixer carries a plurality of annular shaped slip joint units 32, 34, and 36 adapted to engage cooperating joint elements 38, 40 and 42 respectively carried by the turbine exhaust case 12. When the unitary mixer/plug assembly is inserted in place, that is, moved forward relative to the engine from the position shown in the drawing, the slip joint 36 engage the cam like surface 48 which serves to guide the assembly into place.

By virtue of the invention the necessity of bolting the mixer and plug separately to a mating flange on the turbine exhaust case is obviated. It would in heretofore known practices, necessitate welding a mating flange on the turbine exhaust case to accommodate the mating flange on each of the component parts. Hence, the operator would be taxed with the chore of welding each of the flanges to the turbine exhaust case.

Not only does the unitary plug/mixer assembly lend itself to easy maintainability since it is supported at a single point and is removable as a complete unit, it minimizes stress on the already highly stressed support member or bushing 50. This is because the plug is no longer supported to the turbine exhaust case supported by member 50, but is supported by casing 10 via flange 30. Moreover, the slip joint allows for differential thermal growth and permits incorporation of a titanium mixer for reduced weight because the slip joint eliminates creep impact at that location.

It should be understood that the invention is not limited to the particular embodiments shown and described herein, but that various changes and modifications may be made without departing from the spirit or scope of this novel concept as defined by the following claims.

I claim:

1. A combined convoluted lobe mixer and plug for a fan jet engine having a turbine exhaust case and a generally cylindrical tail pipe spaced from and concentric to said turbine exhaust case, said turbine exhaust case having an exit exhausting the gas turbine working medium, said space between said exhaust case and tail pipe defining a passage for the fan exhaust air, said lobed mixer having a plurality of alternately circumferentially spaced crown portions and valley portions, a first plurality of radially extending struts carried by at least some of said crown portions and a second plurality of radially extending struts extending between at least some of said valley portions and said plug, and means carried by said first struts for attaching and providing the primary support for said combined convoluted lobe mixer and plug adjacent said turbine exhaust case for mixing the flow streams from said turbine exhaust case and said passage.

2. A combined lobe mixer and plug as in claim 1 including an annular portion at the outer diameter of said first plurality of struts, and attaching means on said annular portion for supporting said combined lobe mixer and plug to said tail pipe.

3. A combined lobe mixer and plug as in claim 1 including axially aligned seating surfaces on said turbine exhaust case and complimenting axially aligned mating surfaces on the forward end of said combined lobe mixer and plug, and said seating surfaces and mating surfaces being in friction engagement in the assembled position.

4. A combined lobe mixer and plug as in claim 1 including an annular support structure attached to said plug and said second plurality of struts being attached to said annular support structure.

* * * * *